United States Patent [19]
Zaro

[11] 4,020,136
[45] Apr. 26, 1977

[54] METHOD AND APPARATUS FOR THE SIZING OF TUBULAR BODIES OF A THERMOPLASTIC MATERIAL WHICH ARE CONTINUOUSLY EXTRUDED

[76] Inventor: Giosue Zaro, Via Adua, 21, Lonate Pozzolo, Varese, Italy

[22] Filed: Sept. 14, 1972

[21] Appl. No.: 289,140

Related U.S. Application Data

[63] Continuation-in-part of Ser. No. 27,333, April 10, 1970, abandoned.

[30] Foreign Application Priority Data

Apr. 12, 1969 Italy .................................. 15501/69

[52] U.S. Cl. ................................... 264/89; 264/90; 264/209; 264/296; 425/326 R; 425/388
[51] Int. Cl.² ......................................... B29C 17/07
[58] Field of Search ............... 264/89, 90, 92, 95, 264/98, 99, 209, 47, 177 R, 178, 296; 425/72, 326 R, 388

[56] References Cited

UNITED STATES PATENTS

| | | | |
|---|---|---|---|
| 2,423,260 | 7/1947 | Slaughter | 264/209 X |
| 3,169,272 | 2/1965 | Maxson | 264/95 X |
| 3,229,005 | 1/1966 | Reifenhauser | 264/47 |
| 3,274,315 | 9/1966 | Kawamura | 264/177 R X |
| 3,296,661 | 1/1967 | De Moustier | 264/177 R X |
| 3,378,887 | 4/1968 | Reib et al. | 264/90 X |

*Primary Examiner*—Jan H. Silbaugh

[57] ABSTRACT

In a method and a device for vacuum sizing extruded bodies of plastics material, the sizing operation is subdivided, in sequence, between the two or more portions of the cross-sectional outline of the extruded blank. Cooling means can act in cooperation with the sizing tools proper.

10 Claims, 5 Drawing Figures

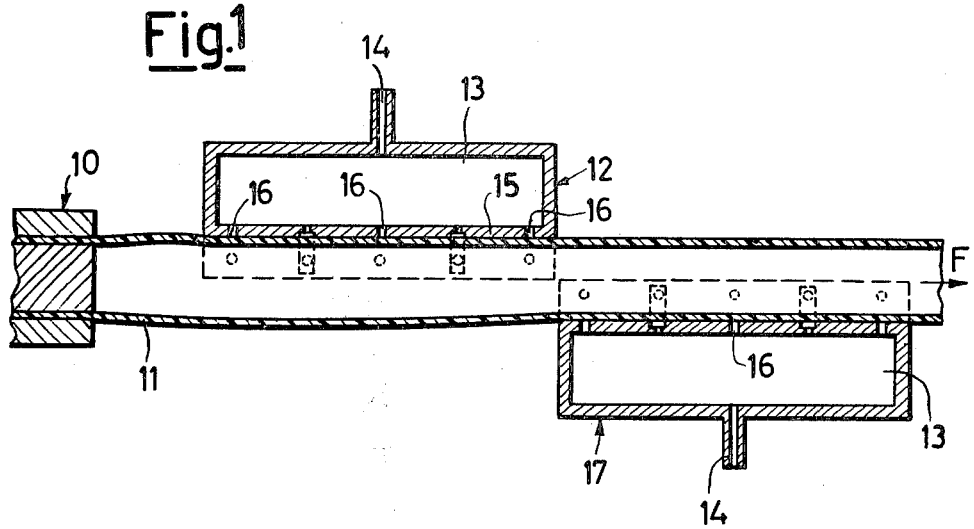
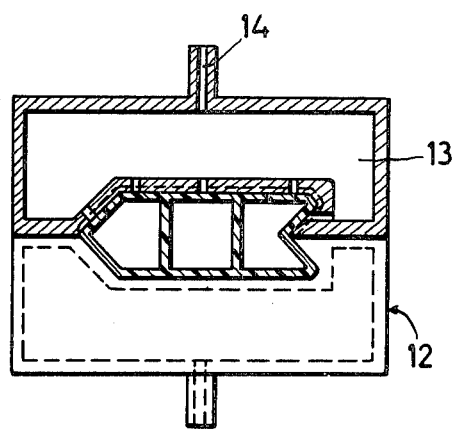
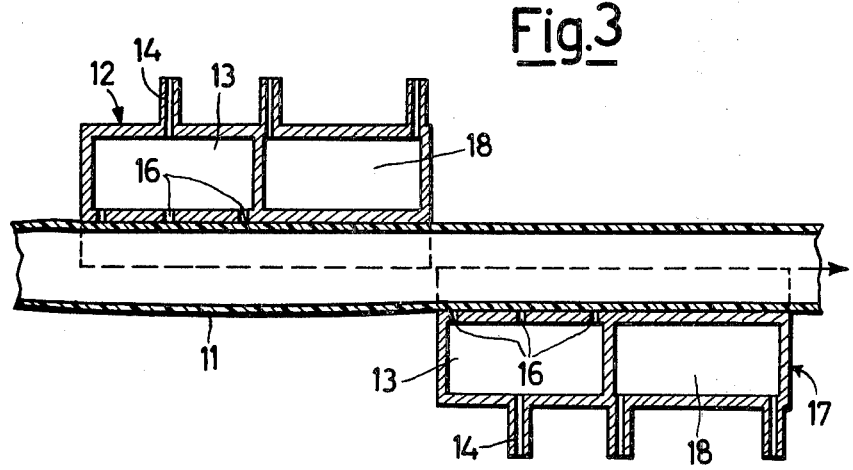

METHOD AND APPARATUS FOR THE SIZING OF TUBULAR BODIES OF A THERMOPLASTIC MATERIAL WHICH ARE CONTINUOUSLY EXTRUDED

This is a continuation in part application of my U.S. patent application Ser. No. 27,333 filed Apr. 10, 1970, now abandoned.

This invention relates to methods for sizing tubular bodies of thermoplastic material which are continuously extruded, and to the apparatus relating to said methods.

Continuous extrusion molding apparatus are known which are adapted to produce tubing or other tubular bodies of thermoplastic material, wherein an extruding screw causes a molten or plasticized thermoplastic material to pass through a suitable die or nozzle, so as to continuously form tubing or the like. These known apparatus will normally deliver tubing of thermoplastic material at a temperature at which the wall material is still deformable, and, as a result, the thus delivered tubing will not perfectly retain the shape imparted to it by the die or nozzle. Sizing apparatus is also known the art aiming to bring an extruded blank to an exact dimension and cross-section shape.

Four sizing techniques are common in the art (see Allan L. Griff, "Plastics Extrusion Technology", 2nd edition, Reinhold Book Corp., New York) including the vacuum trough, the sizing sleeve, the internal mandrel and the set of sizing plates.

According to the vacuum trough technique, the tubing being delivered from the die is led into one end of a long, closed trough and out of the other end, the trough being filled with water, which surrounds the tubing in direct cooling contact therewith. The tubing passes through fixed metal collars or rings as it moves through the trough, which gives it its final size. Inside the trough a vacuum is drawn over the water, which reduces the pressure in the entire trough and causes the still soft pipe to expand against the collars or rings. This expansive force is generated by the pressure differential between the tubing outside under vacuum and the inside open to the atmosphere.

In the sizing sleeve method, the outside diameter of the tubing being extruded is fixed as it is hardened by contact with a water cooled metal sleeve, this contact being achieved by air pressure acting inside the tubing, or by drawing vacuum through the perforated inside surface of the sleeve. The interior surface of the sleeve is roughened to prevent seizing (sometimes a lubricant is applied during extrusion) and the passage is slightly tapered to allow for shrinkage. After emerging from the sleeve the tubing is further cooled in a water trough, within which several sizing plates (discs with holes) may be included to maintain roundness.

According to the extended mandrel method, a hollow, long metal mandrel extends from the die, and the shrinkage of the plastic tubing keeps the tubing itself in tight contact with the mandrel surface. The latter is roughened to prevent the plastic tubing from sticking and seizing as it passes over the mandrel surface, which is tapered with the larger end nearer the die. Inside the mandrel the passage for cooling water must be uniform and streamlined to ensure constant temperature all around.

In the sizing plate method, which was quite popular before the development of the vacuum trough, the tubing being extruded is drawn through a series of brass or stainless steel plates, like the drawing technique for metal wires. A positive air pressure is kept in the tubing to force it against the plates, which have their hole sizes becoming progressively smaller as the pipe cools. The exact number and placement of all the plates is found by trial and/or experience. The first plate can be placed at the entrance to a water trough used for the cooling of the tubing. A modification of the sizing plate method is disclosed in the U.S. Pat. No. 2,423,260 to Slaughter, wherein the draw plates are formed by two or more portions, which together define the outer contour and size of the extruded body, these portions being longitudinally staggered along the axis of the cooling trough, i.e. of the tubing being sized. However, the Slaughter sizing apparatus comprises, unavoidably (as it is clearly stated in the specification), a preliminary draw plate having an opening through which the tubing being extruded is drawn while hot from the extruding operation, and the plate wall adjacent said opening tapers to form a sharp leading acute angled edge for contacting the tubing passing therethrough, coolant being applied to said tubing immediately in front of said draw plate.

Several problems and difficulties arise with respect to all the devices of the prior art, as briefly described above.

The pressure differential across the wall of the tubing being sized is constant both all around the tubing cross section and all along the entire length of the sizing apparatus. Obviously this pressure differential should slightly and constantly vary and particularly increase, upon the thermoplastic material forming the tubing wall increasingly hardens.

The temperature of the cooling water is constant all along the tubing within the sizing apparatus. Of course a temperature progressively varying along the tubing longitudinal axis and proportional to the distance from the extruding die would be more suitable, such as to follow the cooling curve of the thermoplastic material and to avoid thermal shocks. In this connection it is not negligible that the temperature of the cooling liquid might affect the crystallinity of the plastic material.

The sizing method based on the use of a set of sizing plates involves also an internal air pressure, which also causes the tubing to undergo a slight radial expansion in the portions not into contact with a draw plate.

Another problem raised by the known sizing apparatus is that of adapting the apparatus in case the plastic material forming the tubing is changed and therefore the drawing characteristics and requirements to be met are different.

A further problem raised by some known sizing apparatus, wherein cooling water is directly contacted with the tubing outer surface is that of water marks or ripples which are left on the sized tubing.

Still another problem of the prior art methods and apparatus is that of the frictional forces met by the extruded tubing upon being pulled through the sizing tools, since the tubing undergoes strains which leave considerable residual stresses in the tubing as it is cooled, so that marked dimensional deformations result, especially on aging.

It is the object of the invention to solve the above mentioned problems and, to this end, there are provided a method and an apparatus for the sizing of tubular bodies of thermoplastic material as extruded from an extrusion head and while the thermoplastic material is still hot, wherein a subatmospheric pressure is applied to a fraction of the outer surface of the tubular body, such a fraction extending for no more than a half of the section of the tubular body, the inner surface of the tubular body being always left into free communication with the atmospheric air, the vacuum being thereafter applied to the remaining portion of the outer surface of the tubular body, said remaining portion extending for not more than half a section of the tubular body.

Otherwise stated, according to the Applicant'method and apparatus, the sizing action is subdivided not only along the longitudinal axis of the tubular body, but also with respect to the cross section of the tubular body itself, and therefore both the pressure differential, causing the tubular body to be sized, and the cooling action can be carefully and exactly adjusted along the axis of the tubular body, which therefore is surely free from internal residual stresses; in the same time the frictional forces arising when the extruded tubular body is pulled through the sizing apparatus are essentially reduced.

Another advantage of the applicant's method and device resides in that the sizing tools are easily adjusted and servicing and repair operations are readily carried out.

The accompanying drawing show, by way of example only, a few devices adapted to carry out the method according to the subject invention. In the drawing:

FIG. 1 is a longitudinal elevational diagrammatical view of a first embodiment of the invention;

FIG. 2 is a cross-sectional view of the device shown in FIG. 1, partially in elevational view;

FIG. 3 is a longitudinal sectional view, in a diagrammatical showing, of another embodiment of the invention; and;

Figure 4:
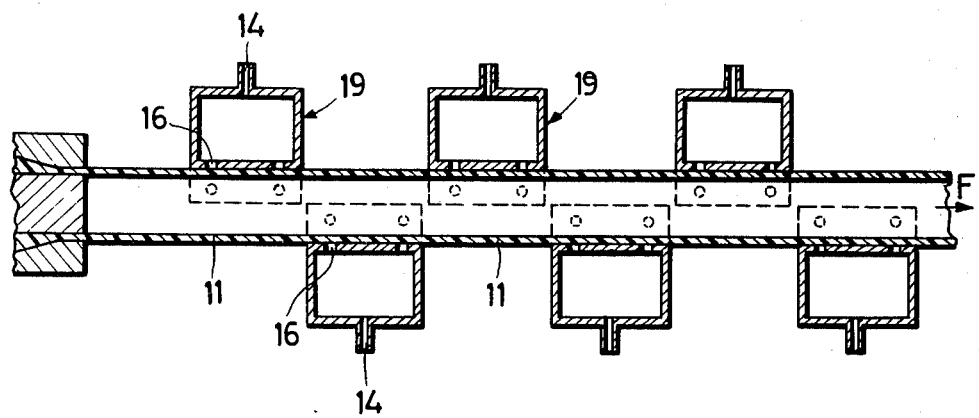
FIGS. 4 and 5 are views, similar to FIGS. 1 and 3, of alternative embodiments.

With reference to the accompanying drawing, the reference numeral 10 generally indicates an extrusion head from which a tubular blank 11 of a plastic material which is still in a soft state, emerges.

Downstream of the extrusion head 10, at an appropriate distance therefrom, a first sizing tool 12 is mounted. This tool comprises a chamber 13 which is evacuated by an appropriate suction means (not shown) connected to a suction tube 14.

The bottom wall 15 of the first sizing tool 12 has a cross-sectional outline matching one half of the cross-sectional outline desired for the finished tubular article 11 and has an array of holes 16 through which, as is well known, a negative pressure is secured between the outer surface of the bottom wall 15 and the outer surface of the article 11 so as to keep the latter against the wall 15 during the sizing of the first half of said article.

At 17 is indicated a second sizing tool which is mounted immediately downstream the first one, but diametrically opposite with respect to the longitudinal axis of the body 11, as clearly shown in FIG. 1.

The latter sizing tool is constructionally equivalent to the first one and the walls 15 of both, each substantially corresponding to one half of the cross-sectional outline desired for the finished tubular article, are longitudinally staggered relative to one another and in opposite diametrical relationship with respect to the longitudinal axis of the extrudate. It should be noted that the walls 15 can have different cross-sectional outlines, as the configuration of the finished extrudate may require. With reference to FIG. 3, it is shown a cooling chamber 18, through which any optional coolant such as water, may be caused to flow. Such cooling chamber cooperates with the vacuum chamber 13 of each of the sizing tools.

Such sizing tools are mounted at such a distance from the extrusion head that the plastic material is still plastically deformable. To the free end of the tubular blank 11 as it emerges from the extrusion head, a certain pulling force F is applied wherein the extrudate is sequentially dragged through both sizing tools.

As clearly shown in FIG. 2, the blank 11, as it is passed into contact with the first tool, is sized over its upper half and this half undergoes, during sizing, a cooling action which is brought about either by the mere heat absorption of the tool, or by means of any cooling means.

Subsequently, the blank is passed into contact with the second sizing tool and its second half is sized, the first half having already taken on a certain stiffness so that it is influenced for a nominal amount only by the drag due to the pulling force F, a pulling force which, by adopting the subject procedure, can be considerably reduced.

It is to be noticed that the atmospheric air pressure is always acting on the inner wall of the tubing, as well as on all the other portions of the outer surface which are not momentarily into contact with the vacuum sizing tools. Therefore if a cross section of the blank is considered e.g. along a line coincident with the axis of the tube 14 in FIG. 1, it will be seen that a portion of the extruded blank is subjected to a sizing pressure differential, whereas the portion of the wall not in contact with the sizing tool does not sustain any differential pressure.

Figure 5:
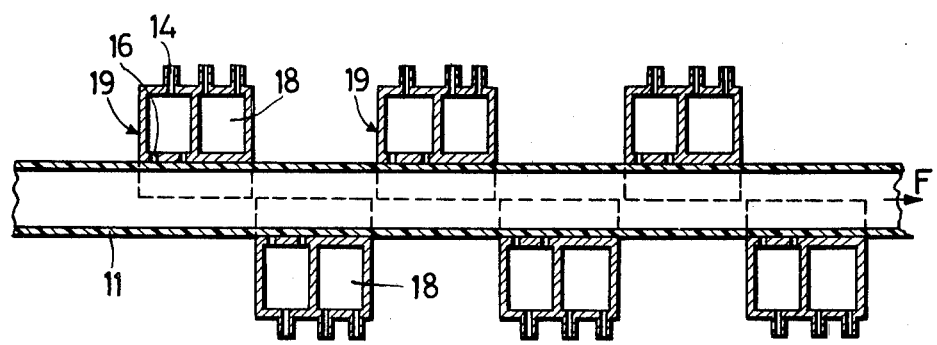

With reference to FIGS. 4 and 5, it can be seen that in alternative embodiments of this invention, the extruded blank 11 can also be caused to pass through a plurality of sizing tools such as 19, whose configuration, arrangement and operability are the same as those of tools 12, 17 as shown in FIGS. 1 and 3, but of a smaller size. The extrusion speed in the device of FIG. 4, and both the extrusion speed and the intensity of artificial cooling in the device of FIG. 5, will be calculated in such a way that the extruded blank, when being passed from one sizing tool to the next, will pass from a certain plasticity to a lesser plasticity but such as not to hinder the sizing of the blank while it simultaneously under-goes to a very slight degree the drag due to the pulling force F.

It is apparent that, by proceeding according to this invention, the frictional forces met by the extruded blanks during progress of the sequential sizing steps are considerably lesser than those encountered when using the conventional tubular tools so that the strains undergone by the extruded blanks are substantially reduced without resulting in the objectionable tensional stresses referred to above.

It will be understood that, as explained before, the pressure differential acting on the wall of the extruded blank can be changed from one end to the other of the sizing apparatus, thus matching the changing status of the tubular blank, which during the passage through the sizing zone is also cooled and reaches a hard condition. Also the temperature of the cooling liquid can be changed and suitably adjusted all along the sizing apparatus.

What is claimed is:

1. A method for the sizing of a tubular blank of a thermoplastic material in a sizing tool, said method comprising extruding the tubular blank through an extrusion head from which the blank exits in a plastic state, and subjecting the plastic blank to the action of a vacuum, in sequence, first over no more than a fraction of its outer surface so as to press said fraction only against part of the sizing tool which is provided with a cross-sectional outline for said fraction of the finished tubular article, and subsequently subjecting the balance of the plastic blank to a vacuum to press said balance against the balance of the sizing tool to give the balance of the blank its finished shape, that part of the blank which is not subjected to vacuum being subjected to ambient atmospheric conditions.

2. A method according to claim 1, wherein the vacuum is applied in more than two sequential steps.

3. A method according to claim 1, wherein each part of the blank is subjected to cooling simultaneously with the application of vacuum thereto.

4. A method according to claim 1, wherein the vacuum is applied sequentially to equal fractions of the blank.

5. A method as claimed in claim 1 wherein said fraction is no more than half the section of the tubular blank.

6. A device comprising an extrusion head for extruding a tubular blank of thermoplastic material, first and second sizing tools arranged in sequence downstreams of said head and angularly displaced with respect to one another around the longitudinal axis of the extruded blank, said tools being located at such a distance from the extrusion head that the thermoplastic material is plastically deformable when received by said tools, each of said two tools having a cross-sectional profile substantially corresponding to a corresponding fraction of a cross-sectional profile desired for a finished extrudate, said tools each having a set of openings adapted for communication with a vacuum source.

7. A device according to claim 6, comprising further sizing tools corresponding to the first and second tools.

8. A device according to claim 6, comprising cooling means cooperating with each of said sizing tools.

9. A device as claimed in claim 6, wherein each tool is so dimensioned and shaped that no more than a fraction of the blank is subjected to vacuum and pulled thereagainst while the balance of the blank is exposed to ambient atmospheric conditions.

10. A device as claimed in claim 6 wherein said fraction is no more than half the section of the tubular blank.

* * * * *